United States Patent

[11] 3,576,112

[72] Inventors Ralph S. Frost
Olympia Fields;
Robert C. Hardt, Chicago Heights, Ill.
[21] Appl. No. 796,255
[22] Filed Nov. 29, 1968
Continuation of Ser. No. 500,426, Oct. 21, 1965, abandoned.
[45] Patented Apr. 27, 1971
[73] Assignee Chemetron Corporation
Chicago, Ill.

[54] FILTERING GAS FROM PELLETIZED $CO_2$ SNOW
13 Claims, 4 Drawing Figs.

[52] U.S. Cl..................................................... 62/10,
62/14, 62/35, 62/341, 62/354
[51] Int. Cl...................................................... F25j 1/00
[50] Field of Search........................................... 62/10, 35, 14, 341, 354

[56] References Cited
UNITED STATES PATENTS

| | | | |
|---|---|---|---|
| 1,546,682 | 7/1925 | Slate............................ | 62/35X |
| 1,643,590 | 9/1927 | Slate............................ | 62/10 |
| 1,894,892 | 1/1933 | Small........................... | 62/35 |
| 1,912,445 | 6/1933 | Goosmann................... | 62/35 |
| 1,976,777 | 10/1934 | Goosmann................... | 62/35 |
| 2,046,260 | 6/1936 | Goosmann................... | 62/35 |
| 2,493,759 | 1/1950 | Freygang..................... | 62/35 |
| 2,639,594 | 5/1953 | Watt............................ | 62/354 |
| 2,738,658 | 3/1956 | Bronson....................... | 62/10 |
| 3,205,673 | 9/1965 | Soderberg.................... | 62/354 |
| 3,274,792 | 9/1966 | Weil et al..................... | 62/354 |

FOREIGN PATENTS

| | | | |
|---|---|---|---|
| 333,212 | 8/1930 | Great Britain............... | 62/35 |
| 477,587 | 12/1937 | Great Britain............... | 62/35 |
| 477,834 | 12/1937 | Great Britain............... | 62/35 |
| 484,570 | 10/1929 | Germany...................... | 62/35 |
| 805,534 | 8/1936 | France | |

*Primary Examiner*—Wilbur L. Bascomb, Jr.
*Attorney*—Nicholas M. Esser

ABSTRACT: Carbon dioxide pellets are produced by flashing liquid carbon dioxide directly into a closed chamber having a reciprocating ram and a perforate head. The carbon dioxide snow and gas formed upon flashing are filtered through tubular sintered metal to deposit carbon dioxide in the chamber and vent the gas therefrom. Carbon dioxide snow is compressed at the head to provide a seal between the atmosphere and the interior of the chamber.

INVENTORS
Ralph S. Frost
Robert C. Hardt
BY
ATTORNEY

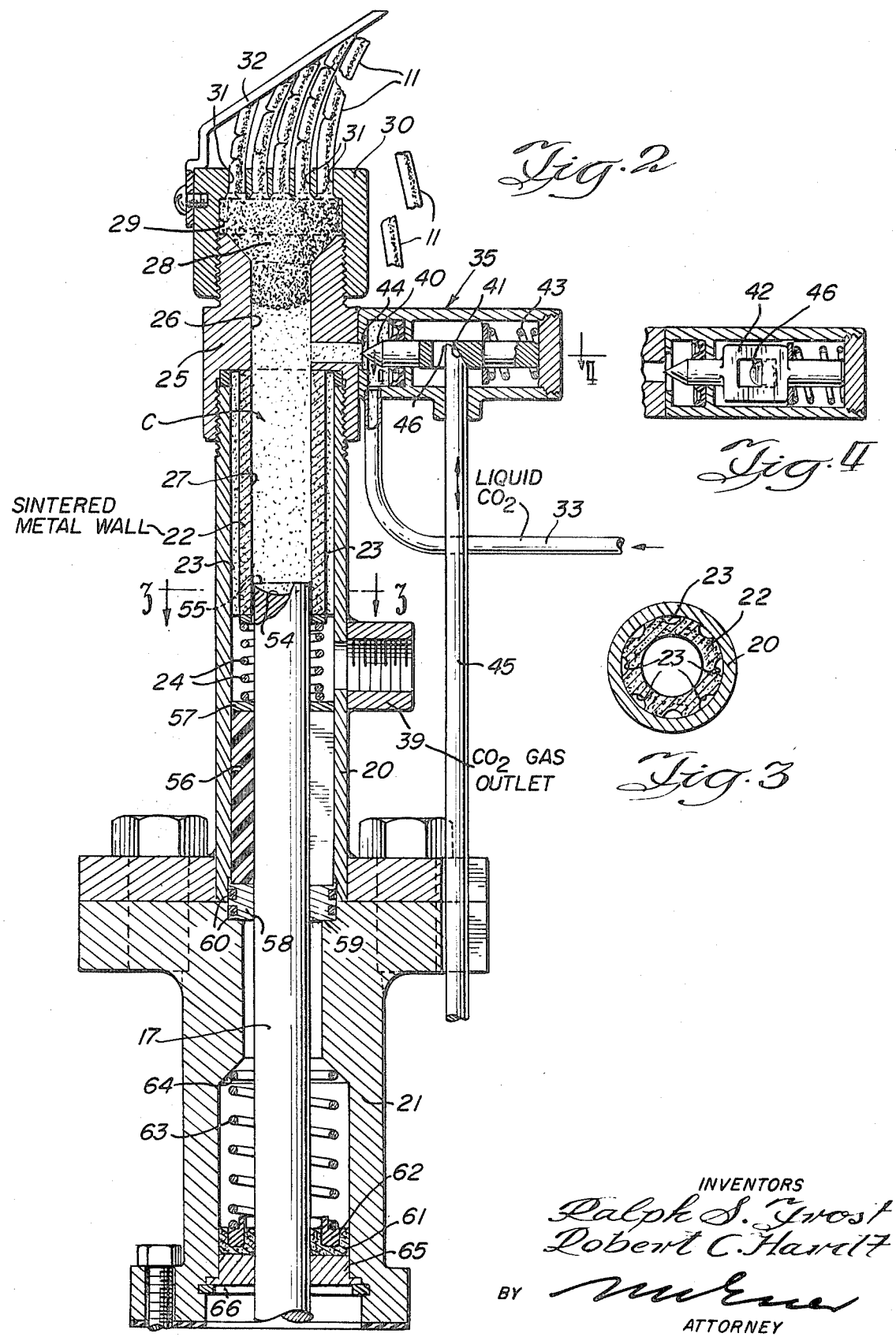

FILTERING GAS FROM PELLETIZED CO₂ SNOW

METHOD AND APPARATUS FOR MAKING PELLETS

This invention relates to method and apparatus for making pellets, and in particular to method and apparatus for continuously and automatically making carbon dioxide pellets.

According to the method of the invention, carbon dioxide liquid is flashed into a closed chamber to form carbon dioxide snow and gas; the snow and gas are separated and the gas is vented out of the chamber; the snow is compressed while it is being forced toward and through passage means; and, importantly, the compressed snow provides a solid carbon dioxide seal between the atmosphere and the chamber at the passage means. As additional snow is progressively formed and compressed, the solid carbon dioxide already forming the seal is forced progressively through the passage means and replaced by additional snow being formed and compressed, and so on. By this method the ambient atmosphere is prevented from entering the chamber even though the pellets are continually being made and yet there is no need to seal off the passage means by a closure or the like; thus not only are the pellets of high quality but the vented carbon dioxide vapor or gas is not contaminated.

Suitable apparatus for carrying out the method of the invention is shown in the accompanying drawings, in which:

FIG. 2 is a fragmentary view showing a portion of the apparatus illustrated in FIG. 1;

FIG. 3 is a sectional view taken along line 3—3 of FIG. 2; and

FIG. 4 is a sectional view taken along line 4—4 of FIG. 2.

Figure 1:
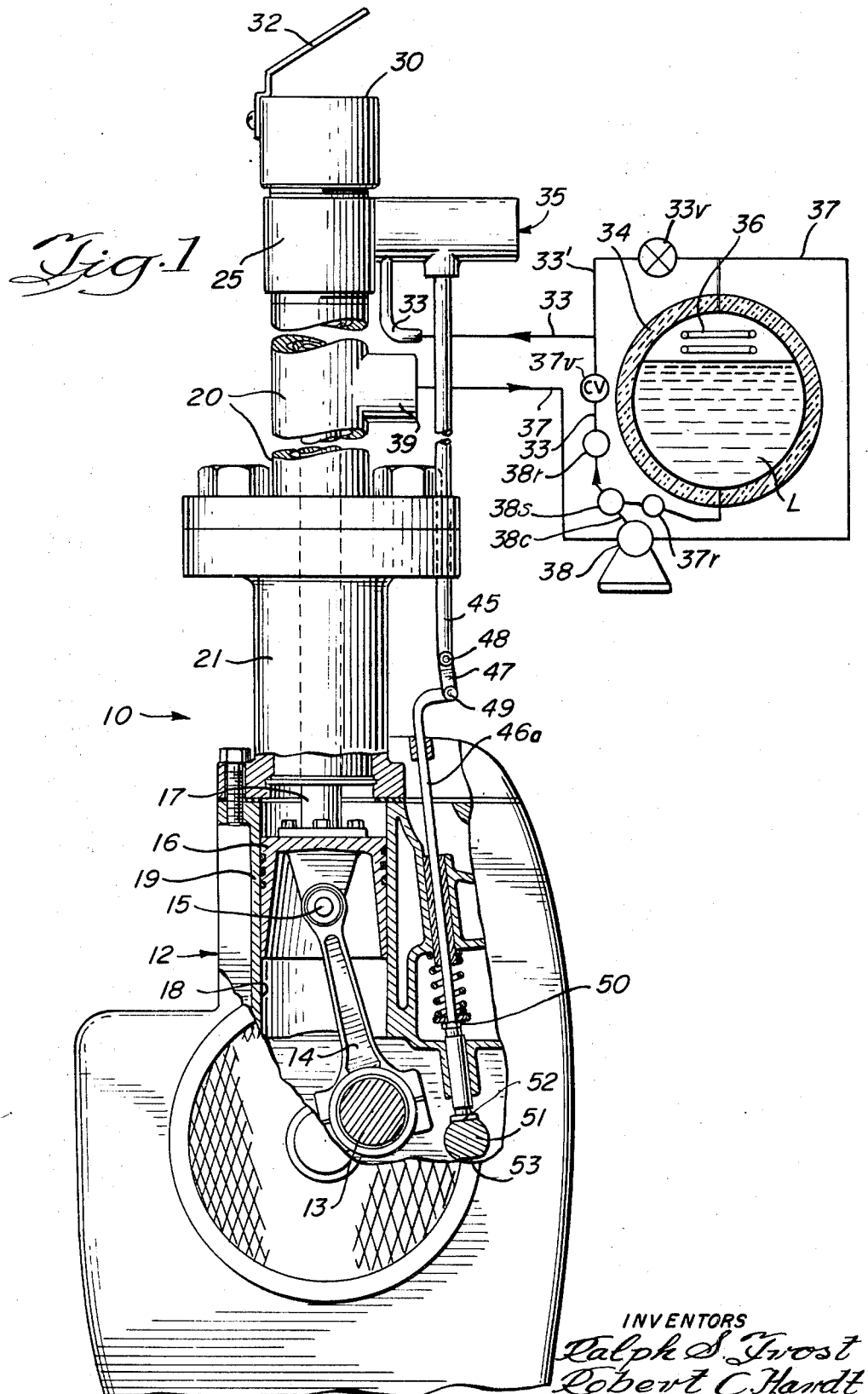
FIG. 1 is an elevational view, partly in section, showing apparatus for carrying out the method of the invention.

Referring now to the drawings there is shown an apparatus generally indicated at 10 for making pellets, for example carbon dioxide pellets 11. Any suitable drive mechanism can be used; a drive mechanism generally indicated at 12 is illustrated having a crankshaft 13 driven for example by an electric motor (not shown). The crankshaft 13 drives a connecting rod 14, connected by a wrist pin 15 to an annular guide 16. Rigidly bolted to the upper surface of the guide 16 is a ram 17. The guide 16 is mounted for reciprocation in a bore 18 in a block 19. As the crank shaft 13 is rotated, the ram 17 reciprocates.

A cylindrical member or casing 20 is secured by a tubular flanged connector 21 to the block 19. The cylindrical member 20 receives a porous separator or filter which is preferably composed of sintered stainless steel or reinforced sintered bronze and forms a sintered metal wall 22. There is slight clearance between the ram 17 and bore 27 of the sintered metal wall 22. The sintered metal wall 22 has lengthwise grooves 23. A spring 24 urges the sintered metal wall 22 against a fitting 25 having a bore 26 which is axially aligned with the bore 27 of the separator 22. The bores 26 and 27 together form part of a closed chamber C the ends of which are closed off the ram 17 and by a plug 28 of compressed snow, that, solid, carbon dioxide. The plug 28 is formed partly in the bore 27 and partly in a bore 29 of a head 30. The head 30 has a plurality of small bores or holes 31 which communicate with the bore 29. A breaker 32 is secured at an angle to the bores 31 in the head 30 and can facilitate breaking solid carbon dioxide passing out of the bores 31 into pellets 11.

A conduit 33 for delivery of a suitable liquid such as carbon dioxide L communicates with the bottom of an insulated storage tank 34 containing the liquid carbon dioxide and a valve assembly 35. In the tank 34 above the liquid L is a cooling coil 36 of a refrigeration system (not shown). A conduit 37 containing a compressor 38 is connected at one end to a carbon dioxide gas outlet port 39 of the cylindrical member 20 and to the upper end of the tank 34. A conduit 33′ containing a valve 33v connects the conduit 37 downstream of the compressor 38 and the conduit 33 downstream of a check valve 37v. The conduit 33 contains a pressure regulator 37r, a liquid and vapor separator 38s and a pressure regulator 38r. A conduit 38c conducts vapor from the separator 38s to the compressor 38.

A valve assembly 35 is preferably employed and is shown to include a valve member 40 having cam surface 41 situated within an enlarged portion 42. A spring 43 urges the pin 40 against a seat 44 when the rod 45, having a cam surface 46, is lowered as viewed in FIG. 2; and the valve member 40 is moved away from the seat 44 against the action of the spring 43 when the rod 45 is raised. The rod 45 is connected to a tappet rod 46a by a link 47 with pins 48 and 49. The tappet rod 46a is adjustable in length by means of a lock nut 50. The tappet rod 46a is actuated by a cam shaft 51 having opposed cam surfaces 52 and 53. The crankshaft 13 and the cam shaft 51 are geared together so that the movements of the ram 17 and the valve member 40 are synchronized.

The stroke of the ram 17 extends from the position shown in FIG. 2 to the lower end of the plug 28. The upper end of the ram 17 has a recess 54 which terminates at a sharp peripheral edge 55. A split bearing 56 is disposed between a washer 57 and a metal seal ring 58. The seal ring 58 bears against an internal shoulder 59 in the connector 21. The seal ring 58 carries O-ring seals 60. Encircling the ram 17 is a U-cup seal 61 composed for example of leather, into which a ring 62 fits. A compression spring 63 acts against an internal shoulder 64 of the connector 21 and against the ring 62. The seal 61 is urged against a metal ring 65 held in place by a retainer 66. The bearing 56 is preferably composed of polytetrafluoroethylene, known commercially as "Teflon."

In operation, the drive mechanism 12 continually reciprocates the ram 17 and opens and closes the valve mechanism 35 in synchronism. The valve member 40 is away from the seat 44 for about 90° to about 150° of revolution of the crankshaft 13. The valve member 40 moves away from the seat 44 when the upper end of the ram 17 is slightly below the upper end of the separator 22. Even when the valve mechanism 35 is timed to stay open for 150° of a crankshaft revolution, the valve mechanism 35 is in the closed position, as is preferred, before the end of the movement of the ram 17 away from the head 30, that is, at the end of its downward movement (FIG. 2). Assuming that the ram 17 has travelled as far as it can toward the head 30 and is starting to move in the opposite direction, when the ram 17 has travelled far enough to expose some of the area of the separator 22, the valve member 40 moves away from the seat 44, and liquid carbon dioxide from conduit 33 is flashed into the chamber C to form snow and carbon dioxide vapor. The snow accumulates in the chamber C and carbon dioxide vapor or gas can pass through the porous filter 22 into grooves 23 and through the port 39 into conduit 37 in which the pressure of the gas is increased so that it can be forced into the tank 34. When the ram 17 starts to move upwardly, the snow in the chamber C is moved toward the head 30 and is progressively compressed, and some of the solid carbon dioxide which constitutes the plug 28 is forced through the bores 31 and the solid carbon dioxide remaining in the bores 26 and 29 and the newly compressed snow now constitutes the plug 28, and so on. It is apparent that with each stroke of the ram 17 toward the head 30, some solid carbon dioxide is forced through the openings 31 and pellets 11 are continuously and automatically being made.

When it is desired to defrost the apparatus 10, the valve 33v is opened and relatively hot vapor is passed through conduit 33′ and 33 to the valve assembly 35. The separator 22 will be completely cleared of snow quickly before the plug 28 is sublimed and the pelletizing operation can be immediately and automatically resumed by closing the valve 33v.

Although the invention has been described as being practiced with carbon dioxide to make solid carbon dioxide pellets, the term "carbon dioxide" as used in the specification and in the appended claims can include other materials that flash to both a solid and vapor below their triple point pressures.

Other embodiments and modifications of this invention will suggest themselves to those skilled in the art, and all such of these as come within the spirit of this invention are included within its scope as best defined by the appended claims.

We claim:

1. Method of making carbon dioxide pellets in a chamber adapted to confine carbon dioxide snow except at a perforate head having at least one opening of substantially reduced cross section compared to the chamber, comprising the steps of: forming a gastight seal of solidified carbon dioxide within the chamber at the perforate head, flashing liquid carbon dioxide to cause carbon dioxide snow and gas to fill the chamber while filtering the snow and the gas in the chamber through a medium impervious to carbon dioxide snow and pervious to carbon dioxide gas to separate said gas from said snow without reference to gravity and while venting the separated gas from the chamber to deposit the separated snow in said chamber, and compressing the snow in the chamber while forcing a substantial portion thereof toward and through the perforate head and while reforming the seal of solidified carbon dioxide from the snow remaining in the chamber at the perforate head.

2. The method of making carbon dioxide pellets according to claim 1, wherein liquid carbon dioxide is flashed directly into the chamber.

3. The method of making carbon dioxide pellets according to claim 2, wherein the snow in the chamber is compressed by movement of a ram in the chamber toward the perforate head.

4. The method of making carbon dioxide pellets according to claim 3, further comprising the step of interrupting the flashing of the liquid carbon dioxide during movement of the ram toward the perforate head.

5. Apparatus for making carbon dioxide pellets, comprising: a chamber adapted to confine carbon dioxide snow except at one end, means for flashing liquid carbon dioxide to cause carbon dioxide snow and gas to fill the chamber, means for venting carbon dioxide gas from said chamber, a snow and gas filter impervious to carbon dioxide snow and pervious to carbon dioxide gas, said filter being disposed between said means for flashing liquid carbon dioxide and said means for venting carbon dioxide gas to separate said snow from said gas without reference to gravity and deposit the separated snow in said chamber, a perforate head at said one end of said chamber having at least one opening of substantially reduced cross section relative to the chamber, a ram reciprocable in said chamber toward and away from said head, and means for actuating said ram, the end of said ram terminating short of said opening to provide a gastight seal at said head composed of carbon dioxide snow compressed by the ram and thus prevent gaseous communication between the atmosphere and said chamber 6. Apparatus as claimed in claim 5, wherein said liquid carbon dioxide flashing means is adapted to flash liquid carbon dioxide directly into the chamber.

7. Apparatus as claimed in claim 6, wherein said filter is tubular and forms part of the chamber.

8. Apparatus as claimed in claim 7, wherein said tubular filter is composed of sintered metal.

9 Apparatus as claimed in claim 7, wherein the end of said ram has a recess terminating in a sharp peripheral edge.

10. Apparatus as claimed in claim 7, including first conduit means for supplying liquid to be flashed, second conduit means for venting the vapor, and means for defrosting the apparatus by passing vapor from said second conduit means through said first conduit means and into said chamber.

11. Apparatus as claimed in claim 5, wherein said liquid carbon dioxide flashing means comprises a valve assembly, said valve assembly having an orifice and a valve element adapted to be actuated to selectively open and close said orifice, and means for actuating said ram and said valve element in timed relationship.

12. Apparatus for making carbon dioxide pellets, comprising: a chamber adapted to confine carbon dioxide snow except for an opening of substantially reduced cross section relative to the chamber; means for flashing liquid carbon dioxide to cause carbon dioxide snow and gas to fill the chamber; means for venting carbon dioxide gas from the chamber, said means comprising a snow and gas filter impervious to carbon dioxide snow and pervious to carbon dioxide gas, said filter being disposed between said means for flashing liquid carbon dioxide and said means for venting carbon dioxide gas to separate said snow from said gas without reference to gravity and deposit the filtered snow in the chamber; and means for compressing the snow in the chamber and forcing a substantial portion of the compressed snow through said opening while forming a gastight seal from the remainder of the compressed snow at said opening.

13. Apparatus as claimed in claim 12, wherein said filter is composed of sintered metal.